Nov. 14, 1939. T. H. O'BRIEN 2,180,065

GROOVED PULLEY FOR ROPE DRIVES

Filed Nov. 18, 1938

INVENTOR.
T. H. O'Brien.

Patented Nov. 14, 1939

2,180,065

UNITED STATES PATENT OFFICE 2,180,065

GROOVED PULLEY FOR ROPE DRIVES

Terence Herriot O'Brien, Kendal, England, assignor to Isaac Braithwaite & Son Engineers Limited, Kendal, England Application November 18, 1938, Serial No. 241,167
In Great Britain December 15, 1937

1 Claim. (Cl. 74—242.5)

This invention relates to fast and loose grooved pulleys for rope drive to enable the driving rope to be readily transferred from the fast pulley to the loose pulley and vice versa.

Grooved rope driving pulleys as at present constructed are not adapted for the transfer of the driving rope from one to the other owing to the rope being embedded in the deep groove of the pulley and consequently rope driving by adjacent fast and loose pulleys is not extensively employed where frequent transfer of rope from one grooved pulley to another is required.

The invention comprises a pair of grooved pulleys—fast and loose—constructed with the inner wall of the loose pulley of greater diameter than the inner adjacent wall of the fast pulley and formed with a laterally projecting nose or flange around the periphery to overlap and shroud the periphery of the inner adjacent wall of the fast pulley over which a rope may readily ride from one pulley to the other.

The invention will be fully described with reference to the accompanying drawing in which.

Figures 1, 2:
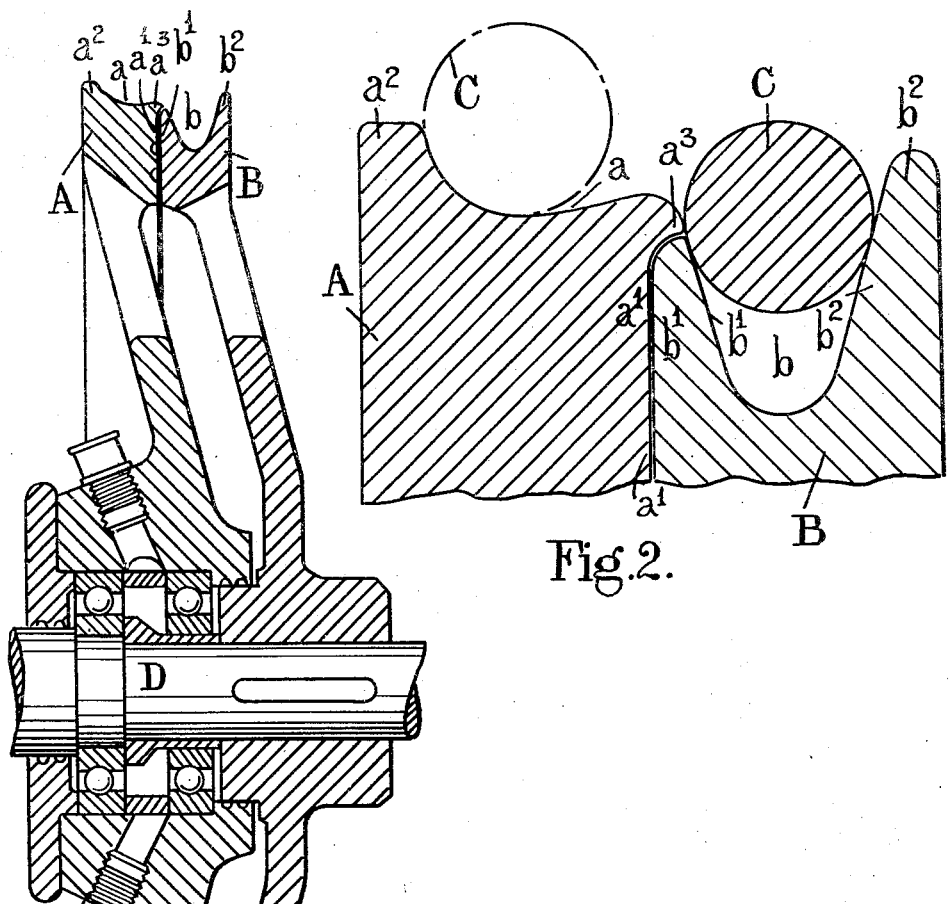
Fig. 1 is a sectional elevation of fast and loose pulleys constructed according to the invention.
Fig. 2 is a horizontal section enlarged of the peripheries of the fast and loose pulleys.

The grooved pulleys are made in pairs to fit closely side by side on a shaft the pulley A to run loose on the shaft and the driving pulley B to be fast on the shaft.

The fast pulley B is constructed with a deep driving groove $b$ of known size and shape to receive a driving rope C. The inner wall $b^1$ of the groove is shorter than the outer wall $b^2$ the latter being extended to form a flange.

The loose pulley A is constructed with a relatively shallow groove $a$ upon which the rope C can run with very little grip. The inner wall $a^1$ of the groove is of less diameter than the outer adjacent wall $a^2$ but is of greater diameter than the inner wall $b^1$ of the fast pulley B. It is also rounded off into a lateral projecting nose or flange $a^3$ forming a track over which the rope C may easily ride from one pulley to the other.

The lateral projection $a^3$ on the inner side wall of the loose pulley A overlaps the inner wall $b^1$ of the fast pulley B and in normal running will contact with the side of the rope C when driving causing the loose pulley to rotate with the fast pulley thereby assisting the transfer of the rope from the fast to the loose pulley. The rope will easily ride over the rounded projection $a^3$ from the loose to the fast pulley.

The lateral projection $a^3$ on the inner side of the loose pulley overlapping the inner wall of the fast pulley enables the rope to be transferred from the loose to the fast pulley without being obstructed by a stationary flange or one moving in opposite direction to the rope.

What I claim as my invention and desire to protect by Letters Patent is:

The combination of a pair of fast and loose grooved rope driving pulleys comprising a fast pulley with a relatively deep groove having the inner wall of the groove of less diameter than the outer wall and also of less diameter than the inner adjacent wall of the groove of the loose pulley and a loose pulley with a relatively shallow groove and the inner wall of the groove of less diameter than the diameter of the outer wall but of greater diameter than the inner adjacent wall of the fast pulley and formed with a laterally projecting nose to overlap the inner adjacent wall of the fast pulley and extend into the path of the rope on the fast pulley in normal running to contact with the side of the rope causing the loose pulley to rotate with the fast pulley thereby assisting the transfer of the rope from the fast to the loose pulley.

TERENCE H. O'BRIEN.